United States Patent
Bllau

(10) Patent No.: US 6,397,962 B1
(45) Date of Patent: Jun. 4, 2002

(54) STEAM ENGINE RADIO FREQUENCY AND BATTERY ELECTRIC DRIVE SYSTEM FOR A MOTOR VEHICLE

(76) Inventor: Robert Bllau, 7 Watch Point Dr., Ft. Thomas, KY (US) 41075

( * ) Notice: Subject to any disclaimer, the term of this patent is extended or adjusted under 35 U.S.C. 154(b) by 0 days.

(21) Appl. No.: 09/455,259

(22) Filed: Dec. 6, 1999

(51) Int. Cl.$^7$ ................................................. B60K 1/00
(52) U.S. Cl. ..................... 180/65.2; 180/65.3; 180/303; 180/310
(58) Field of Search ............................... 180/65.2, 65.3, 180/303, 310

(56) References Cited

U.S. PATENT DOCUMENTS

| | | | | |
|---|---|---|---|---|
| 3,904,883 A | * | 9/1975 | Horwinski | 290/4.5 |
| 4,007,594 A | * | 2/1977 | Elsea, Jr. | 60/618 |
| 4,133,403 A | * | 1/1979 | Priddy, Jr. et al. | 180/65.2 |
| 4,294,075 A | * | 10/1981 | Closs | 60/671 |
| 4,394,582 A | * | 7/1983 | Kreissl et al. | 290/4 C |
| 4,429,203 A | * | 1/1984 | Ramer | 219/687 |
| 4,476,817 A | * | 10/1984 | Lindberg | 123/3 |
| 5,385,211 A | * | 1/1995 | Carroll | 180/65.2 |
| 5,385,214 A | * | 1/1995 | Spurgeon | 180/304 |
| 5,708,306 A | * | 1/1998 | Lin | 307/10.1 |

* cited by examiner

Primary Examiner—Robert P. Olszewski
Assistant Examiner—James S. McClellan

(57) ABSTRACT

A motor vehicle drive system is provided wherein a steam engine and electric drive motor provide propel the vehicle through cooperating clutch controls. Steam to supply the steam engine is created by applying high frequency energy to liquid water until it is transformed into steam. The electrical power for the application of high frequency energy is supplied from a single direct current power source, a battery. The steam engine output shaft is mechanically linked to an alternator that recharges the battery through a voltage regulator.

3 Claims, 1 Drawing Sheet

STEAM ENGINE RADIO FREQUENCY AND BATTERY ELECTRIC DRIVE SYSTEM FOR A MOTOR VEHICLE

FIELD OF THE INVENTION

A motor vehicle driven by an engine having a steam engine and electric motor is disclosed.

BACKGROUND OF THE INVENTION

Internal combustion engines have long been utilized to power motor vehicles but increased pollutants associated with such engines, as well as diminished fuel reserves necessary to supply such engines, have provided the motivation for the development of alternative drive systems.

It is well known that steam engines provide a reliable source of power for driven vehicles, but steam engines have generally been considered to be impractical for use with motor vehicles because extreme heat is required to turn water into steam, which is necessary for operation of the steam engine. Burning of natural resources, such as coal, natural gas, kerosene or petroleum products, is not practical with motor vehicles because of the size and awkwardness of facilities to accomplish such. Further, the use of combustible fuels present a hazard of explosion.

Electric heating of water to turn it into steam to drive a steam engine is also not realistic with a motor vehicle because, without an internal combustion engine, the electric power on a motor vehicle would have to be supplied by self contained batteries. The large size and limited life of batteries providing direct current to heat electric heating elements is restrictive for motor vehicles because the amount of the heat continuously needed to turn water into steam. That is, a series of large, heavy batteries would be necessary to provide adequate heat to operate electric heating elements to turn water into steam, and the life of such batteries would be very limited and would prevent travel of any significant distances. This problem is exacerbated by the weight of the batteries and the additional drive necessary to propel a motor vehicle with such batteries on board.

In recent years alternative methods have been employed to convey heat to objects. The most well-known and widely used alternative consumer heating method has been the microwave oven in which radio frequency energy is transferred to the object to be heated. Other innovations in heat transference include the use of ultrasonic heating and application of energy derived from nuclear reactions. While the present invention is particularly directed to the use of radio frequency energy to supply the energy necessary to bring water to a boil to supply the steam engine, the compact and environmentally pleasing alternatives such as ultrasonic, nuclear and other "clean" fuel sources are specifically contemplated by the principles of the present invention so that the application of such will not be a departure from the present invention.

As is well known in the prior art, electric power may be supplied on a motor vehicle to start the internal combustion engine and to power accessories (lights, gauges, radio, etc.) on the motor vehicle while in operation. A direct current battery supplies the necessary electric power, and such battery is continuously recharged through the use of an alternator which is driven by the internal combustion engine.

A number of prior art references disclose the use of steam engines as contributing sources of power for motor vehicles. All of the prior art devices necessarily include, however, the use of internal combustion engines as the primary source of propulsion for the motor vehicle. U.S. Pat. No. 5,385,211 utilizes an internal combustion engine from which waste heat is applied to boil water necessary to supply an on-board steam engine. The output of the steam engine drives a DC generator which, along with the output from the internal combustion engine, which drives a separate DC generator, supplies and continuously recharges a battery that provides the propulsion for the motor vehicle.

U.S. Pat. No. 5,896,746 discloses an engine assembly including an internal combustion engine and a steam engine. A heat exchanger captures excess heat generated by the internal combustion engine and utilizes the heat to provide steam to drive an on-board steam engine. Provisions are included for storing steam for later use.

U.S. Pat. No. 5,708,306 discloses the use of a steam engine on a motor vehicle, although the use of the steam engine is solely as a supplementary power source.

OBJECTS OF THE INVENTION

It is an object of the present invention to provide a drive system for a motor vehicle that does not require the use of an internal combustion engine for propulsion.

It is another object of the present invention to provide a motor vehicle drive system utilizing a steam engine to provide the primary source of propulsion and as the drive to continuously recharge a DC battery utilized by the vehicle.

It is yet another object of the present invention to provide a motor vehicle drive system wherein an electric drive begins the initial propulsion for the vehicle until sufficient heat is generated to create steam from an onboard water supply to drive a steam engine.

It is a further object of the present invention to provide a motor vehicle drive system wherein output drive shafts from a steam engine and a DC motor are alternatively linked to a drive transmission through the use of controlled-clutches.

It is a further object of the present invention to provide a motor vehicle drive system wherein water is heated to supply a steam engine through the use of radio frequency energy applied.

It is yet another object of the present invention to provide a motor vehicle drive system wherein water is heated through the use of radio frequency energy to supply an on-board steam engine, the radio frequency energy being powered by a DC battery which is continuously recharged by operation of the steam engine.

These and other objects and advantages of the present invention will be apparent from a review of the following specification and accompanying drawings.

SUMMARY OF THE INVENTION

The present invention comprises a motor vehicle drive system comprising a steam engine which provides propulsion to the motor vehicle. A non-combustion means for heating water is provided on-board the motor vehicle so that liquid water can be converted to steam to supply the steam engine. The non-combustion heating means is powered by an electric supply means on the motor vehicle. In addition to the steam engine, an electric drive means on the motor vehicle provides initial propulsion for the motor vehicle prior to propulsion by the steam engine.

The motor vehicle drive system of the present invention has a transmission through which the wheels of the vehicle are driven. An output shaft of the steam engine is releasably engaged to a first input shaft to the transmission through a first clutch. Similarly, the output shaft of the electric drive means is releasably engaged to a second input shaft of the transmission through a second clutch. The engagement of the steam engine to the transmission and of the electric drive means to the transmission are controlled through the first clutch and second clutch so that the electric drive means provides initial propulsion for the motor vehicle, i.e. the second clutch is engaged and the first clutch is disengaged, until liquid water has been heated and converted to steam, at which time the first clutch is engaged and the second clutch is disengaged so that the steam engine drives the motor vehicle. A sensor detects when the steam engine is ready to operate and a control module automatically operates the clutches to provide a smooth transition from being electrically driven to being steam driven.

In the most preferred embodiment of the present invention, the non-combustion heating means for the water is provided by a means for transferring high frequency energy to the water. Radio frequency energy is transferred to the water from a high frequency oscillator, similar to the operation of a consumer microwave oven. Also in the preferred embodiment, a single, direct current electric power source comprising a battery is provided that supplies the power for both the electric supply means for the non-combustion heating means and for the electric drive means providing initial propulsion. To eliminate the need to re-charge the battery when not in use, an alternator is provided which is mechanically interconnected to the output shaft of the steam engine so that, when the steam engine is in operation, the battery is being recharged.

DETAILED DESCRIPTION OF THE INVENTION

Figure 1:
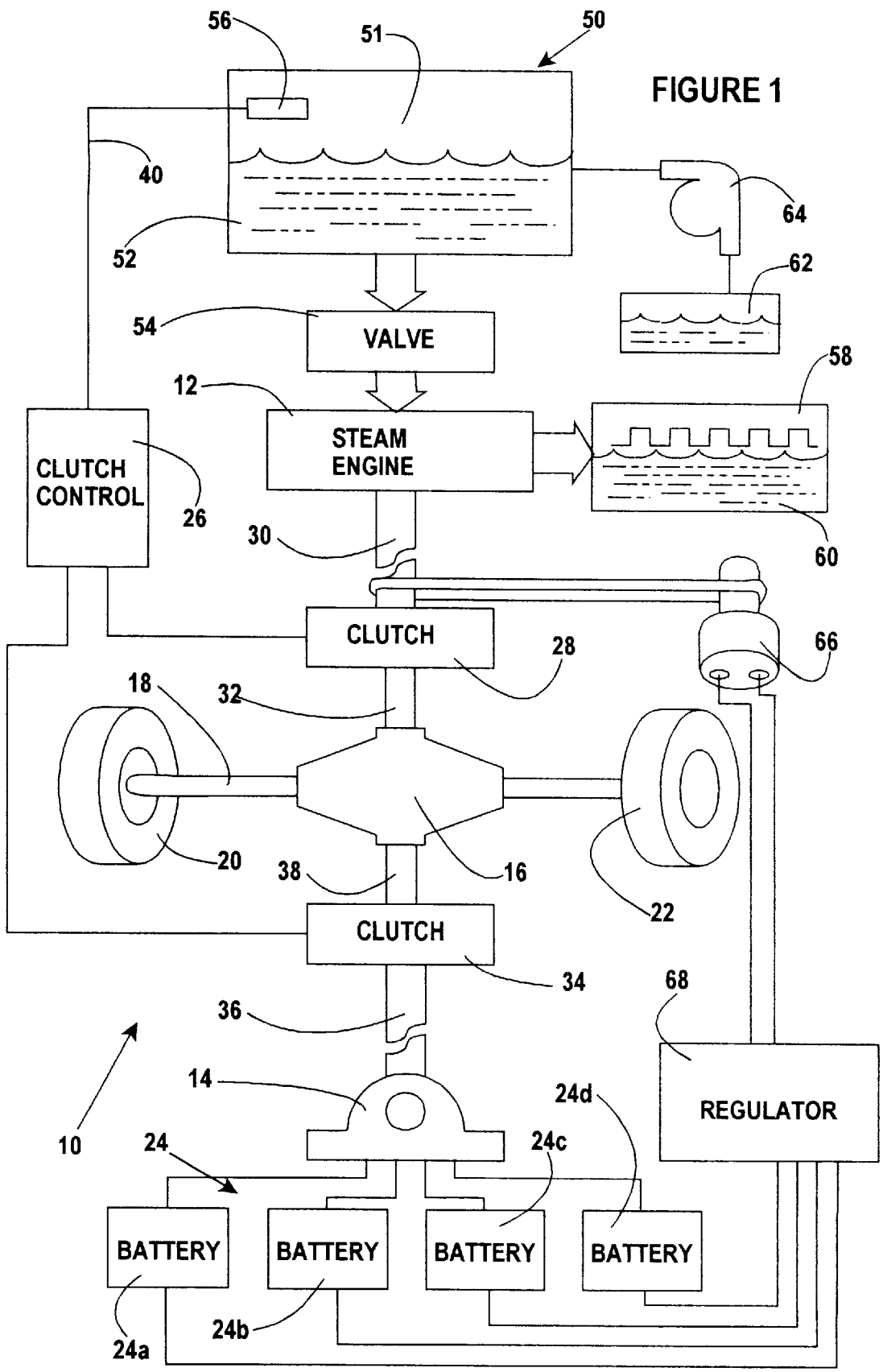
FIG. 1 is a schematic view demonstrating operation of the motor vehicle drive system of the present invention.

The present invention comprises a motor vehicle drive system 10 comprising the major components of a steam engine 12, an electric drive motor 14, and a transmission 16 which drives the wheels 20,22 of the vehicle through drive axle 18.

Operation of the motor vehicle drive system 10 of the present from electrical source 24. The steam then exits the heating means 50 through a control valve 54 and is transferred to the steam engine 12.

A sensor 56 positioned in the heating chamber 51 detects when the liquid water 52 has been transformed to steam and sends a signal along line 40 to the clutch controller 26 so that the above described in engagement of clutch 28 and disengagement of clutch 34 can take place.

After being used to drive the steam engine 12, waste steam is recovered and cooled in a cooling tank 58 and transformed back to liquid water 60. The water 60 is then transferred from cooling tank 58 to a water holding tank 62 until it is required in the heating chamber 51. The water holding tank 62 also has provisions for adding water to make up for that expended in the process. When necessary, water is transferred from the holding tank 62 to the heating chamber 51 by pump 64.

The drive system of the present invention, in its most preferred embodiment, also includes provisions for recharging the direct current power source 24. An alternator 66 is mechanically coupled to the output shaft 30 of the steam engine 12 so that, when the steam engine 30 is in operation, the alternator 66, through voltage regulator 68, charges the batteries 24a, 24b, 24c and 24d. In this way, the electrical source 24 is heating means 50 through a control valve 54 and is transferred to the steam engine 12.

A sensor 56 positioned in the heating chamber 51 detects when the liquid water 52 has been transformed to steam and sends a signal along line 40 to the clutch controller 26 so that the above described in engagement of clutch 28 and disengagement of clutch 34 can take place.

After being used to drive the steam engine 12, waste steam is recovered and cooled in a cooling tank 58 and transformed back to liquid water 60. The water 60 is then transferred from cooling tank 58 to a water holding tank 62 until it is required in the heating chamber 51. The water holding tank 62 also has provisions for adding water to make up for that expended in the process. When necessary, water is transferred from the holding tank 62 to the heating chamber 51 by pump 64.

The drive system of the present invention, in its most preferred embodiment, also includes provisions for recharging the direct current power source 24. An alternator 66 is mechanically coupled to the output shaft 30 of the steam engine 12 so that, when the steam engine 30 is in operation, the alternator 66, through voltage regulator 68, charges the batteries 24a, 24b, 24c and 24d. In this way, the electrical source 24 is recharged and not depleted even while supplying electrical power to the heating means 50. In the most preferred embodiment of the present invention, the high frequency heating means 50 utilizes radio frequency energy or microwave frequency energy, although other forms of electrical energy transfer is specifically contemplated such that their use does not depart from the principles of the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. A motor vehicle drive system comprising:

a steam engine providing propulsion to drive wheels of a motor vehicle;

non-combustion means for heating water to create steam to supply said steam engine an electric supply means for providing power to said non-combustion heating means;

an electric drive means providing initial propulsion for said motor vehicle prior to propulsion by said steam engine;

a sensor that sends a signal when detecting that liquid water has been transformed to steam in said non-combustion means for heating water.

a transmission to drive said wheels of said motor vehicle;

a first clutch positioned between said steam engine and said transmission, engagement of said first clutch taking place upon said sensor detecting that said liquid water has been transformed to steam;

a second clutch positioned between said electric drive means and said transmission;

means for controlling said first clutch and said second clutch so that said electric drive means provides initial propulsion for said motor vehicle and is disengaged upon said sensor detecting that said liquid water has been transformed to steam; and a cooling tank wherein waste steam is recovered and transformed back to liquid water;

wherein said non-combustion heating means comprises means for transferring high frequency energy to said water.

2. The motor vehicle drive system of claim 1 wherein said electrical supply means and said electric drive means are supplied by a single direct current power source.

3. The motor vehicle drive system of claim 2 further comprising an alternator to recharge said direct current power source through a voltage regulator during operation of said steam engine through mechanical interconnection of said alternator and said steam engine.

* * * * *

UNITED STATES PATENT AND TRADEMARK OFFICE
CERTIFICATE OF CORRECTION

PATENT NO.    : 6,397,962 B1
DATED         : June 4, 2002
INVENTOR(S)   : Robert E. Blau It is certified that error appears in the above-identified patent and that said Letters Patent is hereby corrected as shown below:

<u>Title page,</u>
Item [76], replace "Robert E. Bllau" with -- Robert E. Blau --

Signed and Sealed this

Twenty-first Day of January, 2003

JAMES E. ROGAN
*Director of the United States Patent and Trademark Office*